US006281937B1

(12) United States Patent
Tomida et al.

(10) Patent No.: US 6,281,937 B1
(45) Date of Patent: Aug. 28, 2001

(54) RECEIVER IN DATA BROADCASTING SYSTEM

(75) Inventors: Yoshikazu Tomida, Hirakata; Hironori Mitoh, deceased, late of Osaka, by Yoshimi Mitoh, legal representative; Toshiko Hiraoka, Hirakata, all of (JP)

(73) Assignee: Sanyo Electric Co., Osaka (JP)

( * ) Notice: Subject to any disclaimer, the term of this patent is extended or adjusted under 35 U.S.C. 154(b) by 0 days.

(21) Appl. No.: 09/269,180

(22) PCT Filed: Sep. 24, 1997

(86) PCT No.: PCT/JP97/03418

§ 371 Date: May 4, 1999

§ 102(e) Date: May 4, 1999

(87) PCT Pub. No.: WO98/15076

PCT Pub. Date: Apr. 9, 1998

(30) Foreign Application Priority Data

Sep. 30, 1996 (JP) .................................................. 8-259837

(51) Int. Cl.[7] ...................................................... H04N 5/44
(52) U.S. Cl. ............................................ 348/553; 348/468
(58) Field of Search .................................... 348/725, 563, 348/468, 553, 906, 10, 564; 455/45, 186.1, 186.2

(56) References Cited

U.S. PATENT DOCUMENTS 5,729,298 * 3/1998 Wester ................................ 348/468
5,790,958 * 8/1998 McCoy et al. ...................... 455/557
5,812,937 * 9/1998 Takahisa et al. ..................... 455/66
5,870,682 * 2/1999 Miwa et al. ......................... 455/566

FOREIGN PATENT DOCUMENTS 6-188846 7/1994 (JP) .
6-311060 11/1994 (JP) .
7-29935 6/1995 (JP) .
8-116280 5/1996 (JP) .
8-162985 6/1996 (JP) .
8-191252 7/1996 (JP) .

OTHER PUBLICATIONS

"Webcasting comes of age with new application," Info-World, V18 N32 Livingston, p. 30, Aug. 5, 1996.*

* cited by examiner

*Primary Examiner*—Victor R. Kostak
(74) *Attorney, Agent, or Firm*—Arent Fox Kintner Plotkin & Kahn, PLLC

(57) ABSTRACT

In a receiver in a data broadcasting system, a receiver in a second data broadcasting system according to the present invention is characterized by comprising judging device for judging whether or not program data constituting at least one of received programs has been updated, and switching device for switching, when it is judged by the judging device that the program data has been updated, a program to be displayed into the program whose program data updating has been performed.

8 Claims, 3 Drawing Sheets

RECEIVER IN DATA BROADCASTING SYSTEM

TECHNICAL FIELD

The present invention relates to a receiver in a data broadcasting system such as FM multiplex broadcasting and teletext broadcasting.

BACKGROUND ART

In FM multiplex broadcasting, when data constituting a program currently displayed is updated, the displayed contents of the program are also simultaneously updated. Even when data constituting a program other than the program currently displayed is updated, a user is not notified of the updating. In a case where a program other than a news program is displayed, for example, even when the contents of the news program are changed into urgent news by updating, therefore, it is difficult to immediately acquire information relating to the urgent news.

An object of the present invention is to provide a receiver in a data broadcasting system capable of informing a user that data constituting a program has been updated as quickly as possible.

DISCLOSURE OF INVENTION

In a receiver in a data broadcasting system, a receiver in a first data broadcasting system according to the present invention is characterized by comprising judging means for judging whether or not program data constituting at least one of received programs has been updated, and indicating means for indicating on a display, when it is judged by the judging means that the program data has been updated, information that the contents of the program are updated, together with information specifying the program whose program data updating has been performed.

In a receiver in a data broadcasting system, a receiver in a second data broadcasting system according to the present invention is characterized by comprising judging means for judging whether or not program data constituting at least one of received programs has been updated, and switching means for switching, when it is judged by the judging means that the program data has been updated, a program to be displayed into the program whose program data updating has been performed.

In a receiver in a data broadcasting system, a receiver in a third data broadcasting system according to the present invention is characterized by comprising judging means for judging whether or not program data constituting at least one of programs previously designated by a user has been updated, and indicating means for indicating on a display, when it is judged by the judging means that the program data has been updated, information that the contents of the program are updated, together with information specifying the program whose program data updating has been performed.

In a receiver in a data broadcasting system a receiver in a fourth data broadcasting system according to the present invention is characterized by comprising judging means for judging whether or not program data constituting at least one of programs previously designated by a user has been updated, and switching means for switching, when it is judged by the judging means that the program data has been updated, a program to be displayed into the program whose program data updating has been performed.

BEST MODE FOR CARRYING OUT THE INVENTION

Figure 1:
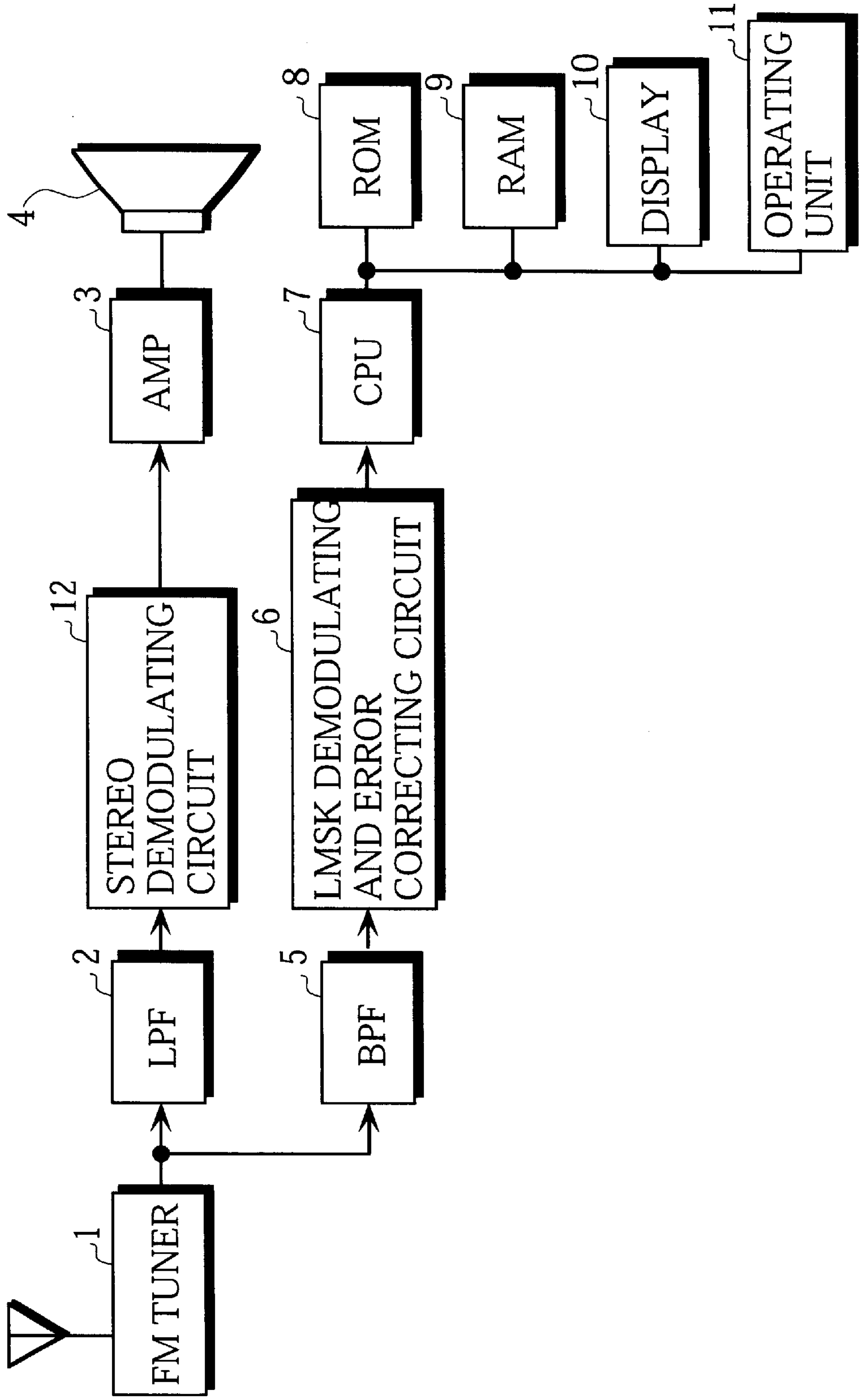
FIG. 1 is a block diagram showing the electrical configuration of a receiver.

Referring now to the drawings, description is made of an embodiment in a case where the present invention is applied to a receiver in an FM multiplex broadcasting system.

[1] Description of Configuration of Receiver

FIG. 1 illustrates the electrical configuration of a receiver.

A voice signal is reproduced through a stereo demodulating circuit 12, an amplifier 3, and a speaker 4 after its high frequency component is removed from an output signal of an FM tuner 1 by an LPF (Low-Pass Filter) 2.

On the other hand, a voice component and a noise component are removed from the output signal of the FM tuner 1 by a band-pass filter (BPF) 5, so that a multiple signal (LMSK signal) is extracted. The extracted multiple signal is sent to an LMSK demodulating and error correcting circuit 6.

The LMSK demodulating and error correcting circuit 6 subjects the sent multiple signal to LMSK demodulation, and performs synchronous detection and error correction processing, to output packet data to a CPU 7.

The CPU 7 reorganizes data for each program on the basis of the packet data sent from the LMSK demodulating and error correcting circuit 6, and stores the reorganized data in a RAM 9. A ROM 8 stores a program and the like of the CPU 7.

When a user operates an operating unit 11 such as a remote controller to select a program, the CPU 7 decodes data constituting the selected program, and displays the decoded data on a display device 10 such as a liquid crystal display.

The receiver has the function of notifying, when data constituting a program previously designated by the user (hereinafter referred to as a program whose data updating is to be reported) has been updated, a user of the updating. Examples of a method of designating the program whose data updating is to be reported include the following methods:

(1) A method of providing an operating unit with a function key for switching the mode into a mode for selecting the program whose data updating is to be reported, switching the mode into the mode for selecting the program whose data updating is to be reported by the function key, and then selecting the program whose data updating is to be reported by a number key.

(2) A method of providing an operating unit with a particular button, and depressing the particular button when the program selected as the program whose data updating is to be reported is displayed. That is, the program displayed when the particular button is depressed is registered as the program whose data updating is to be reported.

(3) A method of providing a second number key for selecting a program whose data updating is to be reported in addition to a normal first number key for selecting a multiplex broadcasting program, and selecting the program whose data updating is to be reported by the second number key when a menu screen is displayed. Only one or a plurality of programs whose data updating is to be reported may be designated.

[2] Description of Data Updating Notification Processing by CPU

Figure 2:
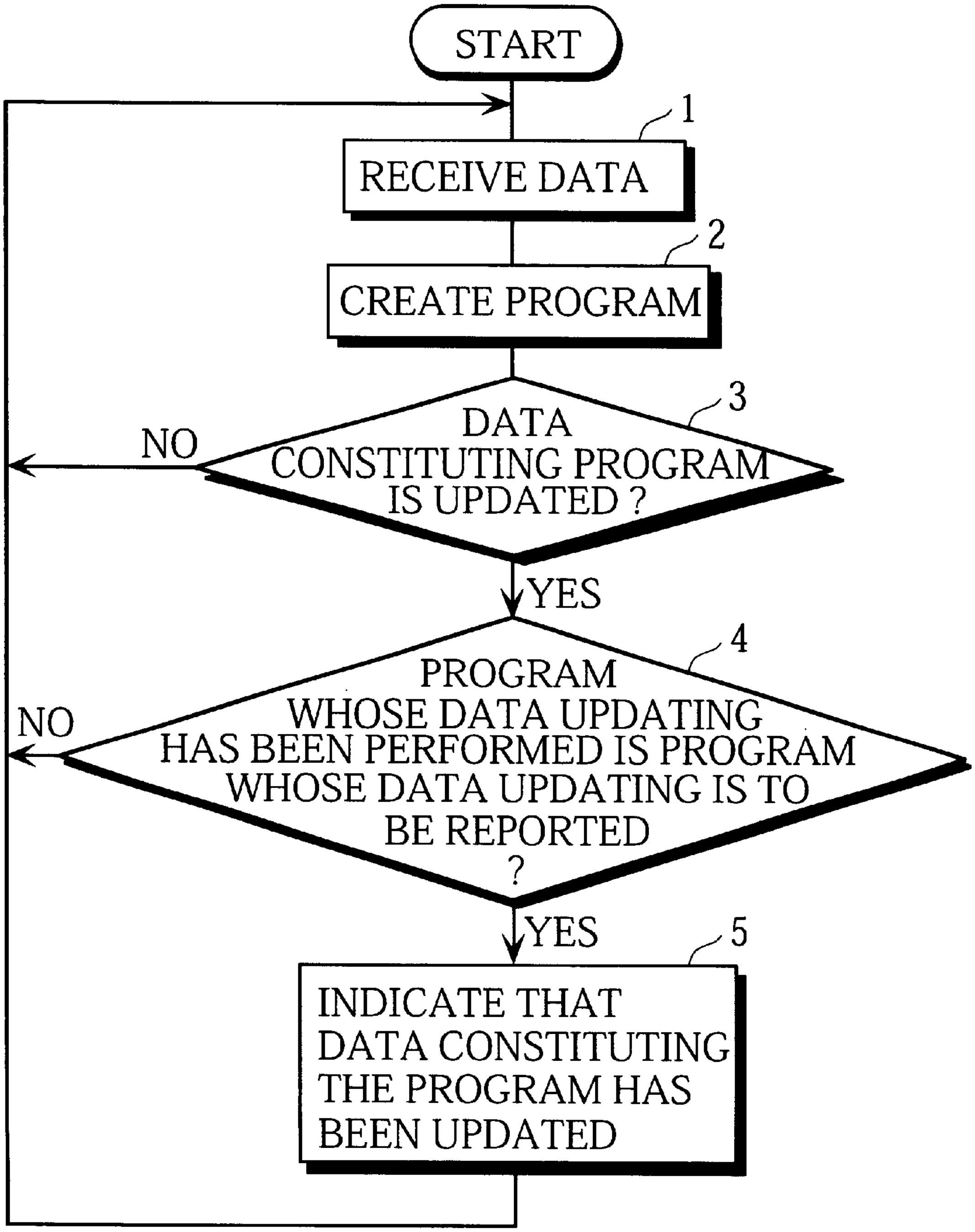
FIG. 2 is a flow chart showing the procedure for notification processing of a program whose data updating has been performed by a CPU.

FIG. 2 illustrates the procedure for data updating notification processing by a CPU.

Data relating to all programs shall have been already acquired in the RAM 9 and stored therein. In such a state, when the data is received (step 1) program creation processing is performed (step 2). In the program creation processing, when there is a program whose contents are updated, data constituting the program stored in the RAM 9 is updated. It is judged whether or not the received data is updated with respect: to data constituting the same program which has been already stored in the RAM 9 on the basis of an updating flag included in a prefix in a data packet (defined in a hierarchy 3 in a hierarchical structure representing a coding system of standard DARC (Data Radio Channel) of FM multiplex broadcasting).

When the data constituting the program has not been updated by the program creation processing, that is, when there is no program whose contents are updated (NO at the step 3), the program is returned to the step 1.

When the data constituting the program is updated by the program creation processing (YES at the step 3), it is judged whether or not the program whose data updating has been performed is a program whose data updating is to be reported which is previously designated by the user (step 4).

When the program whose data updating has been performed is not a program whose data updating is to be reported, the program is returned to the step 1. When the program whose data updating has been performed is a program whose data updating is to be reported, it is indicated on the display device 10 that the data constituting the program has been updated (step 5), after which the program is returned to the step 1.

For example, a program relating to traffic information shall be selected as a program to be displayed. On the other hand, a program relating to weather forecast shall be selected as a program whose data updating is to be reported.

Figure 3:
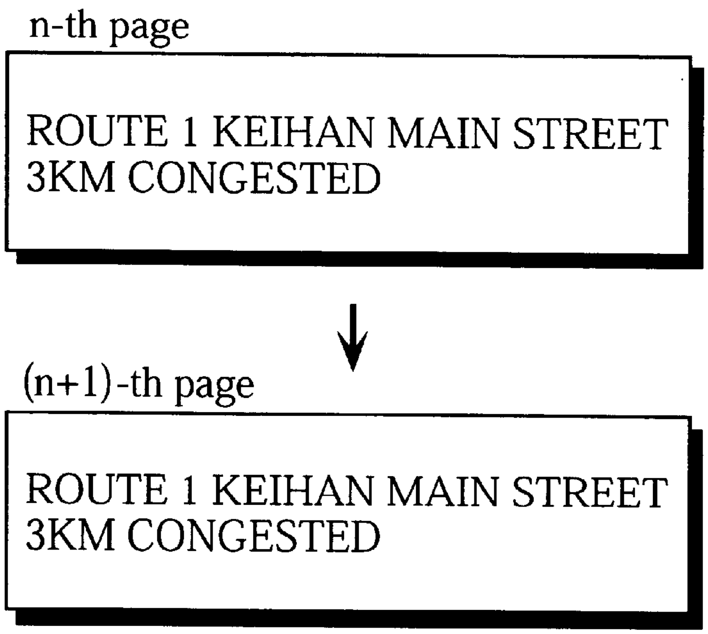
FIG. 3 is a schematic view showing the contents of a traffic information program.
Figure 4:
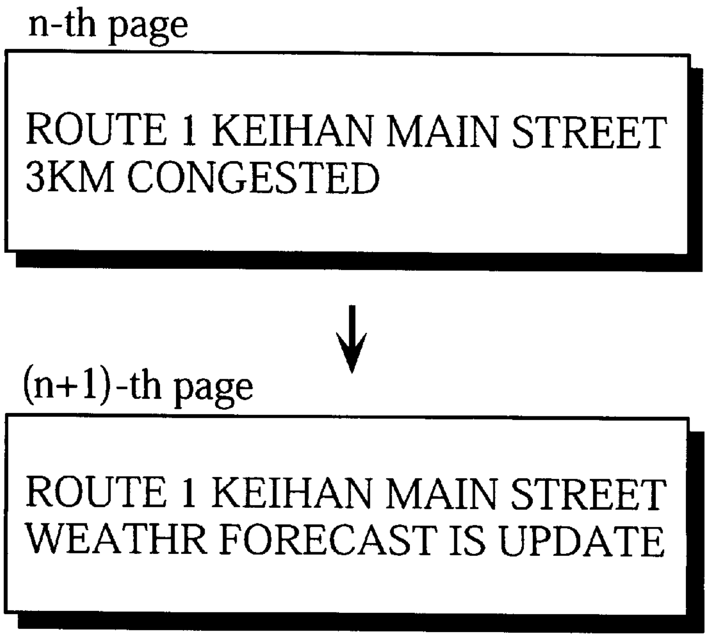
FIG. 4 is a schematic view showing an example of display in a case where the contents of a weather forecast program are updated in a case where the contents of the traffic information program are displayed.

FIG. 3 illustrates the n-th page and the (n+1)-th page which are displayed when the traffic information program is selected. In a case where the (n+1)-th page of the traffic information program is displayed, when the weather forecast program has been updated, characters "weather forecast is updated" are displayed on the second line of the (n+1)-th page of the traffic information program, as shown in FIG. 4.

In the above-mentioned embodiment, when the program whose data updating has been performed by the program creation processing is the program whose data updating is to be reported, it is indicated on the display device 10 that the data constituting the program has been updated. When the program whose data updating has been performed by the program creation processing is the program whose data updating is to be reported, the user may be notified that the contents of the program whose data updating is to be reported are updated by the following methods:

(1) A method of connecting a buzzer as an output equipment of the CPU, and ringing the buzzer when the program whose data updating has been performed by the program creation processing is the program whose data updating is to be reported.

(2) When the program whose data updating has been performed by the program creation processing is the program whose data updating is to be reported, a program to be displayed is automatically switched into the program whose data updating is to be reported.

(3) A method of storing in the RAM 9, when the program whose data updating has been performed by the program creation processing is the program whose data updating is to be reported, the fact that the contents of the program whose data updating is to be reported are updated, and then inverting and displaying, when a menu screen is thereafter displayed, an item corresponding to the program whose data updating is to be reported. Until the item inverted and displayed is selected as a program to be displayed, the display and inversion of the item are continued.

In the above-mentioned embodiment, only when the contents of the program whose data updating is to be reported which is previously designated by the user are updated, the user is notified of the updating. When the contents of at least one of all the received programs are updated, the user may be notified of the updating. In this case, the program whose data updating is to be reported need not be designated by the user.

What is claimed is:

1. A receiver in a data broadcasting system, comprising:

judging means for judging whether or not program data constituting at least one of received programs has been updated; and indicating means for indicating on a display, when it is judged by the judging means that the program data has been updated and a program whose program data has been updated is not a program which is currently displayed, information that the contents of the program are updated, together with information specifying the program whose program data updating has been performed.

2. A receiver in a data broadcasting system, comprising:

judging means for judging whether or not program data constituting at least one of received programs has been updated; and switching means for switching, when it is judged by the judging means that the program data has been updated and a program whose program data has been updated is not a program which is currently displayed, a display to display the program whose program data updating has been performed.

3. A receiver in a data broadcasting system, comprising:

judging means for judging whether or not program data constituting at least one of programs previously designated by a user has been updated; and indicating means for indicating on a display, when it is judged by the judging means that the program data has been updated and a program whose program data has been updated is not a program which is currently displayed, information that the contents of the program are updated, together with information specifying the program whose program data updating has been performed.

4. A receiver in a data broadcasting system, comprising:

judging means for judging whether or not program data constituting at least one of programs previously designated by a user has been updated; and switching means for switching, when it is judged by the judging means that the program data has been updated and a program whose program data has been updated is not a program which is currently displayed, a display to display the program whose program data updating has been performed.

5. An apparatus comprising:

a tuner which receives program data of a plurality of programs;

a controller, operatively connected to said tuner to receive the program data of the plurality of programs as an input, the controller being operative to determine whether or not the program data of a first program of the plurality of programs has been updated; and a display, operatively connected to said controller, the display being operative to display information specifying the first program when the controller determines that the program data of the first program has been updated and the first program is not a program being currently displayed.

6. An apparatus comprising:

a tuner which receives program data of a plurality of programs;

a controller, operatively connected to said tuner to receive the program data of the plurality of programs as an input, the controller being operative to determine whether or not the program data of a first program of the plurality of programs has been updated; and a display, operatively connected to said controller, the display being operative to display the first program when the controller determines that the program data of the first program has been updated and the first program is not a program being currently displayed.

7. An apparatus comprising:

a tuner which receives program data of a plurality of programs;

an input unit allowing a user to designate a program of the plurality of programs;

a controller, operatively connected to said tuner to receive the program data of the plurality of programs as an input, the controller being operative to determine whether or not the program data of the program designated by the user has been updated; and a display, operatively connected to said controller, the display being operative to display information specifying the program designated by the user when the controller determines that the program data of the program designated by the user has been updated and the program designated by the user is not a program being currently displayed.

8. An apparatus comprising:

a tuner which receives program data of a plurality of programs;

an input unit allowing a user to designate a program of the plurality of programs;

a controller, operatively connected to said tuner to receive the program data of the plurality of programs as an input, the controller being operative to determine whether or not the program data of the program designated by the user has been updated; and a display, operatively connected to said controller, the display being operative to display the program designated by the user when the controller determines that the program data of the program designated by the user has been updated and the program designated by the user is not a program being currently displayed.

* * * * *